Sept. 9, 1958 A. O. PITNER 2,851,319
PISTON AND PROCESS OF CONSTRUCTING SAME
Filed May 29, 1953 6 Sheets-Sheet 1

Fig.1

Inventor
Alfred Otto Pitner
By Albert L. Ely, Attorney

Sept. 9, 1958   A. O. PITNER   2,851,319
PISTON AND PROCESS OF CONSTRUCTING SAME
Filed May 29, 1953   6 Sheets-Sheet 2

Inventor
Alfred Otto Pitner
By Albert L. Ely  Attorney

Sept. 9, 1958  A. O. PITNER  2,851,319
PISTON AND PROCESS OF CONSTRUCTING SAME
Filed May 29, 1953  6 Sheets-Sheet 3

Inventor
Alfred Otto Pitner
By Albert L. Frey, Attorney

Sept. 9, 1958 A. O. PITNER 2,851,319
PISTON AND PROCESS OF CONSTRUCTING SAME
Filed May 29, 1953 6 Sheets-Sheet 5

Fig.12

Sept. 9, 1958            A. O. PITNER            2,851,319
PISTON AND PROCESS OF CONSTRUCTING SAME
Filed May 29, 1953                               6 Sheets-Sheet 6

Fig.13

United States Patent Office 2,851,319
Patented Sept. 9, 1958

2,851,319

PISTON AND PROCESS OF CONSTRUCTING SAME

Alfred Otto Pitner, Paris, France, assignor to Société dite: Societe Anonyme des Roulements A. Aiguilles, Rueil-Malmaison, France, a French company Application May 29, 1953, Serial No. 358,313

Claims priority, application France June 7, 1952

25 Claims. (Cl. 309—19)

In machines of all kinds using pistons and, particularly, in compressors and low power internal combustion engines, the piston pins have always been a source of multiple weaknesses both from the point of view of their construction and from that of their functioning.

A first solution of installing a piston pin consisted in locking it to the small end of the connecting rod of the piston for example by means of clamping screws and in having this pin journalled in the bosses of the piston itself; then, the pin was locked to the piston, the journalling being effected between the small end and the piston itself, either directly or with the interposition of a ring made of an appropriate metal or alloy.

If the first solution offers advantages, the fixing of the pin in the small end presents certain drawbacks, in particular in consequence of the necessity to use screws which may give rise to difficulties in functioning and even for compressors or two-stroke engines in which, practically, the load transmitted by the piston in the bosses is regularly exerted in a single direction, the solution of the pin fixed in the piston and journalling in the eye in the small end is often preferred.

The present invention aims at obviating the disadvantages presented by the methods of execution generally employed for fixing a piston pin in the small end of its connecting rod and for making this piston pin journal in the bosses of the piston.

The objects of the present invention are:

(1) A process of installing a piston of a piston machine in which the pin of this piston is journalled in known manner in the bosses of this piston and this process is characterized by the fact that:

(a) The pin of this piston is constructed hollowed out and with an external diameter corresponding to its correct fitting in the eye of the small end;

(b) Before this fitting, this piston pin is submitted to a surface hardening treatment which is carried out in its parts intended to be journalled in the bosses of this piston, leaving without surface hardening its median part which is intended to be located opposite the eye of the foot of the connecting rod at the time when this matter is fitted;

(c) Once correctly placed in the eye of the small end, this hollowed piston pin is submitted to a diametrical expansion treatment of its non-hardened median part which then is placed opposite this eye in such a manner as to lock this pin with this small end.

(2) The methods of carrying this process into effect.

(3) The pistons and the piston machines resulting from the application of this process and from the methods of carrying it into effect.

(4) The stock of tools used for putting this process into effect.

This process is based on the fact that it has been established that it is possible to superficially harden the parts of the piston pin intended to be journalled in the bosses of the piston and then to submit the median part of this same pin to a diametrical expansion sufficient to ensure its perfect locking to the small end, in which it has been engaged, and to carry out this diametrical expansion without there resulting therefrom a deformation detrimental to the functioning of the parts of the pin thus hardened when these parts are journalled in the bosses of the piston.

This is a particularly interesting fact which gives the process a very particular value.

Moreover, the hardening applied to these parts makes it possible to contribute effectively to keeping the dimensions initially provided.

The process of installing pistons of piston machines which constitutes the object of the present invention is capable of being carried out in numerous ways as regards the means of putting into effect:

(a) The hardening of the extremities of the pin.
(b) The diametrical expansion of the non-hardened median part of the piston pin.

Any known method of superficially hardening a metal may be employed for hardening the journalling parts of piston pins according to the present invention; this thus embraces the applications of all these known methods to the journalling parts of these pins.

Any means capable of producing a diametrical expansion of the non-hardened median part of these same piston pins without involving deformation of the surface-hardened journalling parts may likewise be applied. Furthermore, according to the present invention, certain of these means can be put into operation.

(a) Either so as to produce an elastic deformation of the non-hardened median part of the piston pin
(b) Or so as to produce, in addition, a permanent deformation of this same part.

Among the means which may be used for producing this diametrical expansion, by way of example and only in this way, there may be mentioned:

(1) The provision, in the hollowed part of the piston pin, of a full central transverse partition integral with the said pin and the employment of means of diametrical expansion of the said partition by compression exerted on its two faces, by any appropriate means, so as to provoke the diametrical expansion of this partition and, consequently, that of the corresponding median part of the piston pin, it being possible for this partition to be:

(a) Integral with the piston pin, or
(b) Inserted into the hollow in this pin.

(2) The provision, in the central part of the hollow in the piston pin of a constriction of the section of this hollow, the introduction into the said constriction of an expander cone and the use of means of driving the said cone into the said constriction in such a manner as to cause a diametrical expansion of this constriction, which expansion brings about a diametrical expansion of the median part of the piston pin.

Also, according to the present invention, in this case of the use of a piston pin with a hollowed out portion constricted in its central part, this constriction can be effected in a variety of ways; it may, for instance, be formed:

(a) In one piece with the piston pin,
(b) In a piece inserted into the hollow of the said pin, which hollow is then cylindrical and smooth; this inserted piece can, for example be:

(I) a closed ring,
(II) a split ring.

As regards the expander member, this can itself also be installed in a variety of ways. By way of example, it can be indicated that it may be formed by:

(a) A conical member with constant conicity, (b) A conical member with conicities decreasing progressively following its axis, (c) A member containing an end part of variable diameter adjacent to a cylindrical part.

According to the various methods of execution described above, the constriction made in the hollow portion of the piston pin is smooth, and the expander cone employed in combination with this restriction is also smooth over its whole length.

But the present invention also permits other ways of putting into effect. Thus:

(a) The hollow part provided in the piston pin may have a cylindrical shape with a shoulder against which is blocked a wire coiled into the shape of a screw, (b) An expander cone may be fitted in the interior of the coils of this screw, (c) Means of forcing this cone into the said coils may be applied.

As another example of implementing the invention, it may further be indicated that the constriction provided in the hollow in the piston pin may be threaded; the expander cone employed in this constriction is then itself threaded at a suitable pitch, introduced, and forced by rotation into the said threaded constriction.

Many pistons and many piston machines may be constructed in conformity with the principles defined above.

The diagrammatic drawings attached hereto, which are given by way of example and which cannot in any way limit the scope of the present patent application, refer to some of them.

In these drawings,

Figs. 1 and 2 refer to pistons the hollowed pins of which are each provided with a full central partition.

In these various figures, the diametrical expansion of the pin of each piston shown has been amplified considerably for a better understanding of the invention. For the same reason, in Fig. 3 and the following figures, the conicities of the expander members have likewise been amplified considerably.

In all the figures, the same reference numbers denote the same components.

Figure 1:
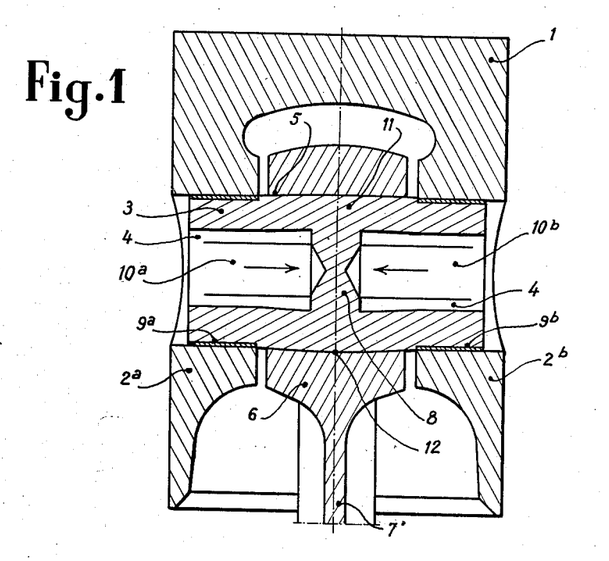
Fig. 1 shows a piston with a pin of this type in which this central partition is made integral with the pin.

In Fig. 1, the piston 1 provided with bosses 2a and 2b receives the pin 3 hollowed at 4—4 and mounted in the said bosses through the eye 5 in the foot 6 of the connecting rod 7. This pin is cylindrical externally and is constructed with a transverse partition 8 integral with it. The extremities 9a, 9b of this pin have been surface-hardened; this hardening may, for instance, result from tempering. In all the figures, this hardening of the ends 9a, 9b is indicated by a thick line. Thus treated, the pin 3 is engaged successively through one of the bosses 2a, 2b of the piston, the eye 5 of the foot 6 of the connecting rod 7, and the second boss of the piston. By means of tube expanders not visible in Fig. 1 and terminated by two bars 10a and 10b engaged in the hollow portions 4—4 of the pin 1, the material of the partition 8 is submitted to a peripheral jumping which causes, in the central part 11 of this pin 3, a radial expansion 12 of this part in the eye 5. As a result of this swelling 12 of its median part 11, the pin 3 is locked, in the eye 5, with the foot 6 of the connecting rod 7.

Figure 2:
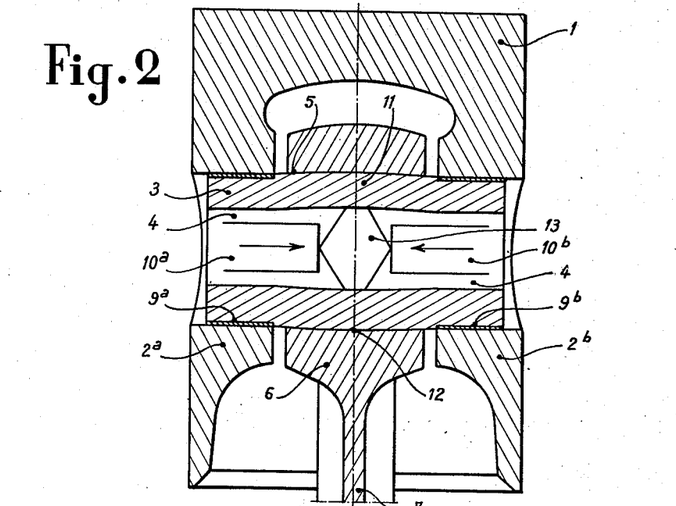
Fig. 2 shows a piston with a pin of the same type into which the central partition has been inserted.

In Fig. 2, the central partition 13 located in the hollow portion 4—4 is a partition inserted into this hollow portion; apart from this sole difference, everything that has just been said concerning Fig. 1 is applicable to this Fig. 2.

To unlock the piston pin from the eye of the connecting rod, in case of need, it is sufficient, for example, to remove the central partition 13 by means of a tool, which causes the relaxing of the tensions caused at the time of the expansion and decreases the diameter at 12 of the piston pin in its part fixed in the sleeve.

However, when it is desired to provide, in the course of the working of the piston, for dismantling of the latter into its elements—piston properly called, pin, and connecting rod—and for possible re-use of its components, the piston pin may be mounted with gentle friction in the bosses of the piston and the eye of the connecting rod, and the deformation imparted to the piston pin due to a removable member engaged in the piston pin in order that, by removal of the said member, the swelling of the median part of the piston pin may disappear, at least partially, it being then possible to take down and separate this pin both from the piston and from the connecting rod.

Figs. 3 to 12 give examples of means which can be employed for these purposes.

In the various examples in Figs. 3 to 7, the hollowed piston pin is constructed integral with an internal projection 14 located opposite the median part 12 which is to undergo the diametrical expansion.

This internal projection creates a constriction 15 in the hollow part of the piston pin.

An expander member 16 is engaged in the said constriction so as to cause a deformation of the median part 12 of the pin.

Thus when the piston has to be taken down, it is sufficient to withdraw this expander member 16 so that the median part 12 of the piston pin may re-assume approximately its cylindrical shape and that the pin 3 may be detached from the piston 1.

Figure 3:
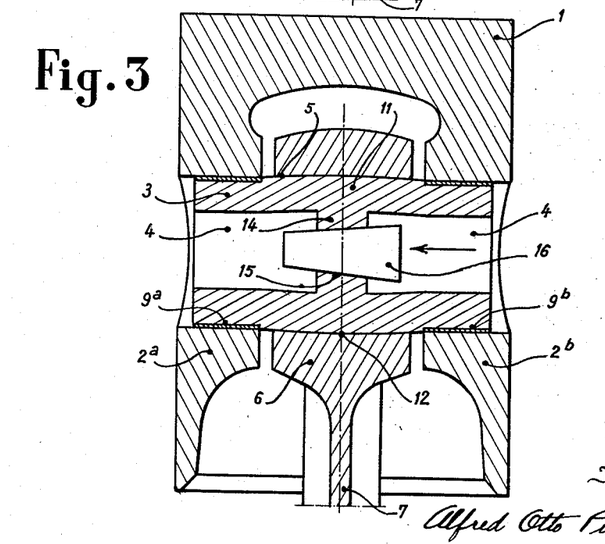
Fig. 3 refers to a piston in which the fitting pin of the small end has a hollowed portion constructed with a constriction made integral with this pin, a conical expander member having constant conicity being forced in this constriction.

In Fig. 3, the constriction 16 has a smooth surface and the expander element is formed by a metal cone of constant taper from one of its extremities to the other.

Figures 4, 5, 6:
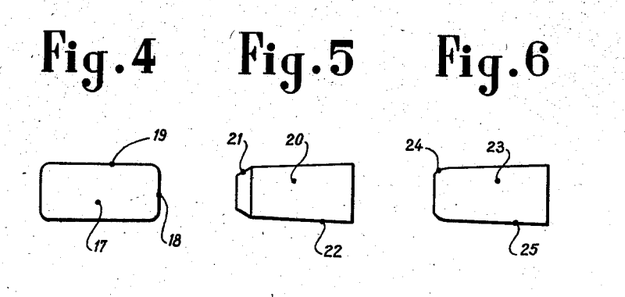
Figs. 4 to 6 show expander members of various forms intended for co-operating with piston pins similar to that in Fig. 3.

Figs. 4, 5 and 6 show other forms of expander members.

In Fig. 4, the expander member 17 has extremities 18 of reduced diameter, whilst for all the rest of its length 19 it is cylindrical, so that the diametrical swelling given to the median part of the pin is limited to a predetermined value selected optima for the piston concerned.

In Fig. 5, the expander member 20 has an end part of short length and accentuated taper, followed by a part 22 of slight conicity and forming the rest of this member. In particular, it will be possible to make the conicity sufficiently slight so that, after its fitting, the expander may be kept in place, even under the action of jars and vibrations, which, with a greater conicity, would cause the loosening of the expander member.

In Fig. 6, the expander 23 has an external part 24 of short length of initially considerable conicity and decreasing progressively, falling to a slight value for all the rest 25 of the length of the said expander.

Figure 7:
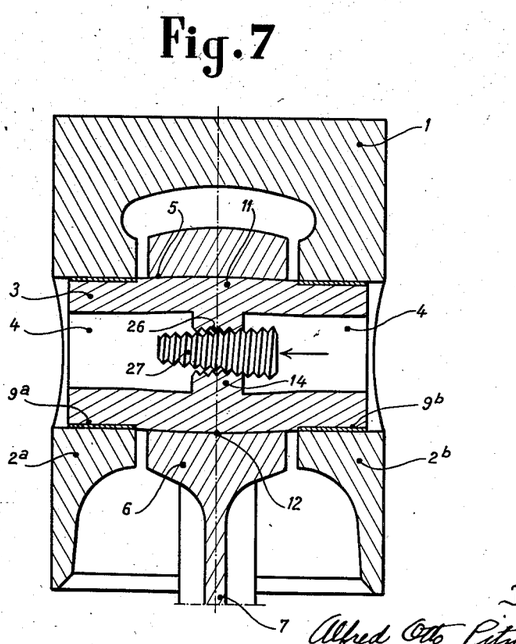
Fig. 7 shows a piston, the hollowed pin of which is provided with a threaded conical constriction in which is engaged a threaded expander member, also conical.
Figure 8:
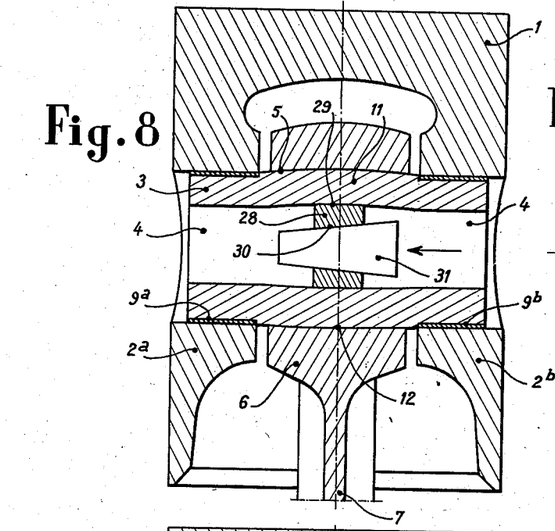
Fig. 8 relates to a piston, into the hollowed pin of which a closed ring has been inserted and subjected to the action of an expander cone.
Figure 9:
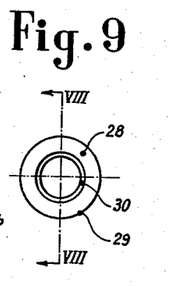
Fig. 9 shows this ring viewed perpendicularly to its axis.

In Fig. 7, the internal face 26 of the constriction made in the hollowed part of the piston is conical and threaded, and the expander 27 used in combination with this constriction is constituted by a threaded cone of constant or axially variable conicity.

In Figs. 8 to 11, the means used to effect the diametrical expansion of the median part of the piston pin comprise substantially the use of a piston pin 3 constructed with a smooth, cylindrical hollow portion 4 and of a ring 28 with a cylindrical exterior surface 29 adjusting itself in this hollow portion. This ring has a conical interior surface 30 and receives the expander member 31 consisting of a cone of constant conicity.

Figure 10:
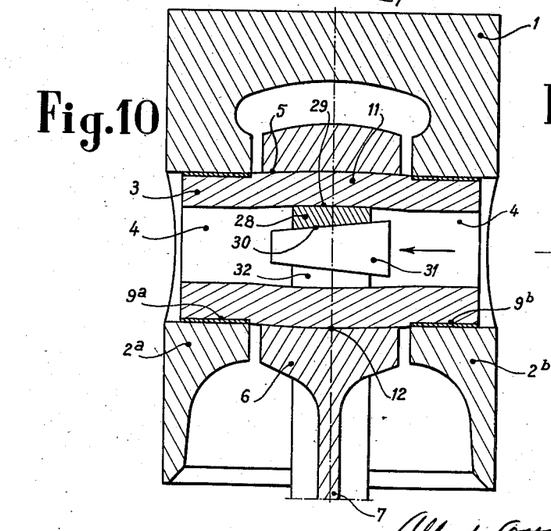
Figs. 10 and 11 are similar to Figs. 8 and 9, from which they only differ by the fact that the ring inserted into the hollow pin of the piston is a ring split radially.
Figure 11:
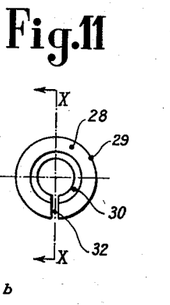

In Figs. 10 and 11, this ring is split at 32.

Figure 12:
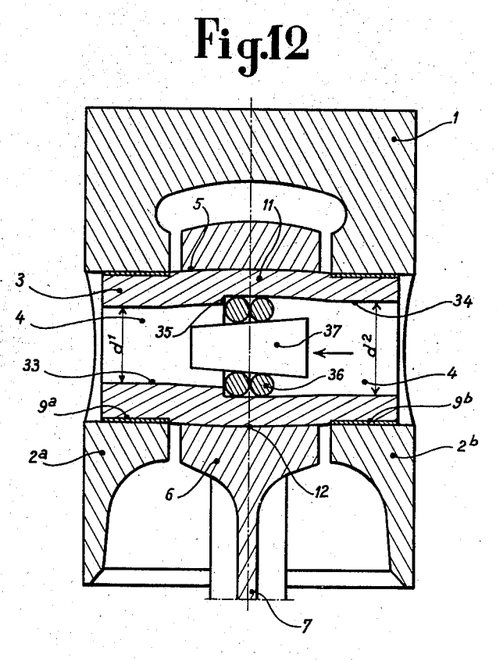
Fig. 12 shows a piston in the hollowed pin of which a constriction is created by a helicoidal member abutting against a shoulder of the hollowed portion of the piston pin, an expander cone being engaged in this helicoidal member to produce the diametrical expansion of the median part of the piston pin.

In Fig. 12, the hollow portion 4 of the piston pin has two parts of different diameters—one part 33 of a diameter $d^1$ smaller than the diameter $d^2$ of the other part 34, so as to constitute, in the said hollow portion of the piston pin, a shoulder 35 against which there abuts an annular member 36, in the interior of which the expander 37 exerts its action; here, this annular member is formed by a wire coiled into screw shape.

Figure 13:
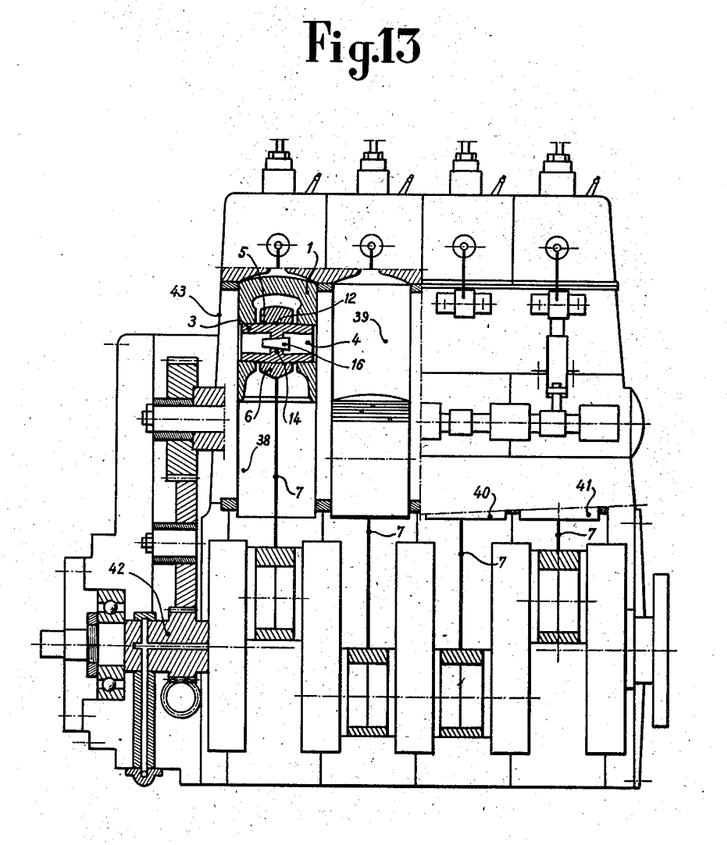
Fig. 13 shows, partly in elevation and partly in vertical section, a four cylinder machine the pistons of which are provided with hollowed pins constructed in accordance with the invention.

Finally, Fig. 13 shows, partly in elevation and partly in axial vertical section through one of the cylinders, a four-cylinder engine the pistons of which are constructed according to the principles set out above. In this engine, 38, 39, 40, 41 are the cylinders, 42 the crankshaft, 43 the frame. The piston 1 shown in vertical section is, like that in Fig. 3 described above, provided with a pin 3 of which the hollow part 4 has a constriction 14 has undergone a diametrical expansion under the action of the expander cone 16 so that in its part 12, this pin has a swelling which ensures its locking with the eye 5 of the small end 7. When this swelling has been effected in the limits of the permanent deformations such that the diameter obtained is, at the maximum, equal to the bore of one of the bosses of the piston 1, it suffices to withdraw the expander cone 16 in order to be able to separate the pin 4 from the connecting rod 6 and from the piston 1 and to proceed to the inspection of these various components for any useful purposes.

As stated, all these figures only give examples of numerous embodiments made possible by the invention.

What I claim is:

1. A process of constructing a piston assembly of a piston machine comprising a piston, a connecting rod having a small end with an eye therein and a pin of soft steel extending through said eye and journalled in the bosses of said piston consisting in constructing the pin of said piston hollowed with a continuous external peripheral wall along its whole length and with an external diameter corresponding to its correct mounting in the eye of the small end, before this mounting submitting said piston pin to a surface hardening treatment which is carried out in its parts intended to be journalled in the bosses of said piston and leaving without surface hardening its median part intended to be located opposite the eye of the small end at the time of the mounting of the pin, once correctly mounting said thus treated pin successively in one boss of the piston, the eye of the small end and the other boss of the piston, submitting said hollowed pin to a treatment of diametrical expansion of its non-hardened median part along the whole periphery thereof in such a manner as to lock said pin with said small end along said whole periphery of said median part.

2. A process of constructing a piston assembly of a piston machine comprising a piston, a connecting rod having a small end with an eye therein and a pin of soft steel extending through said eye and journalled in the bosses of said piston consisting in constructing the pin of said piston hollowed with a continuous external peripheral wall along its whole length, and with an external diameter corresponding to its correct mounting in the eye of the small end, before this mounting submitting said piston pin to a surface hardening treatment which is carried out in its parts intended to be journalled in the bosses of said piston and leaving without surface hardening its median part intended to be located opposite the eye of the small end at the time of the mounting of the pin, once correctly mounting said thus treated pin successively in one boss of the piston, the eye of the small end and the other boss of the piston, submitting said hollowed pin to a treatment of diametrical expansion of its non-hardened median part along the whole periphery thereof, in such a manner as to produce an elastic deformation of said part and thus to lock said pin with said small end along said whole periphery of said median part.

3. A process of constructing a piston assembly of a piston machine comprising a piston, a connecting rod having a small end with an eye therein and a pin of soft steel extending through said eye and journalled in the bosses of said piston consisting in constructing the pin of said piston hollowed with a continuous external peripheral wall along its whole length and with an external diameter corresponding to its correct mounting in the eye of the small end, before said mounting submitting said piston pin to a surface hardening treatment which is carried out in its parts intended to be journalled in the bosses of said piston and leaving without surface hardening its median part intended to be located opposite the eye of the small end at the time of the mounting of the pin, once correctly mounting said thus treated pin successively in one boss of the piston, the eye of the small end and the other boss of the piston, submitting said hollowed pin to a treatment of diametrical expansion of its non-hardened median part in such a manner as to produce a permanent deformation of this part along the whole periphery thereof and thus to lock said pin with said small end along said whole periphery of said median part.

4. A process of constructing a piston assembly of a piston machine comprising a piston, a connecting rod having a small end with an eye therein and a pin of soft steel extending through said eye and journalled in the bosses of said piston consisting in constructing the pin of said piston hollowed with a continuous external peripheral wall along its whole length and with an external diameter corresponding to its correct mounting in the eye of the small end, before said mounting providing said hollowed pin with a transverse median partition, submitting said piston pin to a surface hardening treatment which is carried out in its parts intended to be journalled in the bosses of said piston and leaving without surface hardening its median part intended to be located opposite the eye of the small end at the time of the mounting of the pin, once correctly mounting said thus treated pin successively in one boss of the piston, the eye of the small end and the other boss of the piston, then submitting said transverse median partition to a treatment of diametrical expansion of the same to bring about a corresponding diametrical expansion of the outer non-hardened cylindrical median part of said pin along the whole periphery thereof and to lock said median part with the small end along said whole periphery of said median part.

5. A process of constructing a piston assembly of a piston machine comprising a piston, a connecting rod having a small end with an eye therein and a pin of soft steel extending through said eye and journalled in the bosses of said piston consisting in constructing the pin of said piston and hollowed with a continuous external peripheral wall along its whole length and provided with a full median partition integral therewith and with an external diameter corresponding to its correct mounting in the eye of the small end, before said mounting submitting said piston pin to a surface hardening treatment which is carried out in its parts intended to be journalled in the bosses of the piston and leaving without surface hardening its median part intended to be located opposite the eye of the small end at the time of the mounting of the pin, once correctly mounting said pin thus treated successively in one boss of the piston, the eye of the small end and the other boss of the piston, then submitting said hollowed pin to compressions simultaneously exerted on both side of said full median partition to bring about a diametrical expansion of the outer non-hardened cylindrical median part of said pin along the whole periphery thereof and to lock said median part with the small end along said whole periphery of said median part.

6. A process of constructing a piston assembly of a piston machine comprising a piston, a connecting rod having a small end with an eye therein and a pin of soft steel extending through said eye and journalled in the bosses of said piston consisting in constructing the pin of said piston hollowed with a continuous external peripheral wall along its whole length and with an external diameter corresponding to its correct mounting in the eye of the small end, before said mounting inserting a transverse partition into the median part of said hollowed portion of said pin and fixing said partition within said hollowed portion, submitting said piston pin to a surface hardening treatment which is carried out in its parts intended to be journalled in the bosses of said piston and leaving without surface hardening its median part intended to be located opposite the end of the small end at the time of the mounting of the pin, once correctly mounting said thus treated pin successively in one boss of the piston, the eye of the small end and the other boss of the piston, then submitting said hollowed pin to compressions simultaneously exerted on both sides of said full median partition to bring about a diametrical expansion of the outer non-hardened cylindrical median part of said pin along the whole periphery thereof and to lock said median part with the small end along said whole periphery of said median part.

7. A process of constructing a piston assembly of a piston machine comprising a piston, a connecting rod having a small end with an eye therein and a pin of soft steel extending through said eye and journalled in the bosses of said piston, said process consisting in constructing the pin of said piston hollowed with a continuous external peripheral wall along its whole length and with an external diameter corresponding to its correct mounting in the eye of the small end, the hollow portion of said pin being provided in its median part with a transverse median partition which is itself provided with an axial constriction, before mounting said piston pin in the eye of the small end submitting said pin to a surface hardening treatment which is carried out in its parts intended to be journalled in the bosses of said piston and leaving without surface hardening its median part intended to be located opposite the eye of the small end at the time of the mounting of the pin, once correctly mounting said thus treated pin successively in one boss of the piston, the eye of the small end and the other boss of the piston, and forcing an expander cone in the constriction of said transverse median partition in order to expand the non-hardened median part of said piston pin along the whole periphery thereof in such a manner as to lock said pin with said small end along said whole periphery of said median part.

8. A process of constructing a piston assembly of a piston machine comprising a piston, a connecting rod having a small end with an eye therein and a pin of soft steel extending through said eye and journalled in the bosses of said piston, said process consisting in constructing the pin of said piston hollowed with a continuous external peripheral wall along its whole length and with an external diameter corresponding to its correct mounting in the eye of the small end, the hollow portion of said pin being provided in its median part with a transverse median partition which is integral with said pin itself and provided with an axial constriction, before mounting said piston in the eye of the small end submitting said pin to a surface hardening treatment which is carried out in its part intended to be journalled in the bosses of said piston and leaving without surface hardening its median part intended to be located opposite the eye of the small end at the time of the mounting of the pin, once correctly mounting said thus treated pin successively in one boss of the piston, the eye of the small end and the other boss of the piston, and forcing an expander cone in the axial constriction of said transverse median partition in order to expand the non-hardened median part of said piston pin along the whole periphery thereof in such a manner as to lock said pin with said small end along said whole periphery of said median part.

9. A process of constructing a piston assembly of a piston machine comprising a piston, a connecting rod having a small end with an eye therein and a pin of soft steel extending through said eye and journalled in the bosses of said piston, said process consisting in constructing the pin of said piston hollowed with a continuous external peripheral wall along its whole length and with an external diameter corresponding to its correct mounting in the eye of the small end, the hollow portion of said pin being inwardly cylindrical and smooth and provided in its median part with a transverse median partition which is inserted into said hollow portion and itself provided with an axial constriction, before mounting said piston in the eye of the small end submitting said pin to a surface hardening treatment which is carried out in its parts intended to be journalled in the bosses of said piston and leaving without surface hardening its median part intended to be located opposite the eye of the small end at the time of the mounting of the pin, once correctly mounting said thus treated pin successively in one boss of the piston, the eye of the small end and the other boss of the piston, and forcing an expander cone in the constriction of said transverse median partition in order to expand the non-hardened median part of said piston pin along the whole periphery thereof in such a manner as to lock said pin with said small end along said whole periphery of said median part.

10. A process of constructing a piston assembly of a piston machine comprising a piston, a connecting rod having a small end with an eye therein and a pin of soft steel extending through said eye and journalled in the bosses of said piston, said process consisting in constructing the pin of said piston hollowed with a continuous external peripheral wall along its whole length and with an external diameter corresponding to its correct mounting in the eye of the small end, the hollow portion of said pin being inwardly cylindrical and smooth and provided in its median part with a transverse median partition which consists of a closed ring inserted into said hollow portion and itself provided with an axial constriction, before mounting said piston pin in the eye of the small end submitting said pin to a surface hardening treatment which is carried out in its parts intended to be journalled in the bosses of said piston and leaving without surface hardening its median part intended to be located opposite the eye of the small end at the time of the mounting of the pin, once correctly mounting said thus treated pin successively in one boss of the piston, the eye of the small end and the other boss of the piston, and forcing an expander cone in the constriction of said closed ring in order to expand the non-hardened median part of said piston pin along the whole periphery thereof in such a manner as to lock said pin with said small end along said whole periphery of said median part.

11. A process of constructing a piston assembly of a piston machine comprising a piston, a connecting rod having a small end with an eye therein and a pin of soft steel extending through said eye and journalled in the bosses of the piston, said process consisting in constructing the pin of said piston hollowed with a continuous external peripheral wall along its whole length and with an external diameter corresponding to its correct mounting in the eye of the small end, the hollow portion of said pin being provided in its median part with a transverse median partition which is integral with said pin itself and provided with a threaded constriction, before mounting said piston pin in the eye of the small end submitting said pin to a surface hardening treatment which is carried out in its parts intended to be journalled in the bosses of said piston and leaving without surface hardening its median part intended to be located opposite the eye of the small end at the time of the mounting of the pin, once correctly mounting said thus treated pin successively in one boss of the piston, the eye of the small end and the other boss of the piston, and introducing by rotation a threaded expander in the threaded constriction of said transverse median partition in order to expand the non-hardened median part of said piston pin along the whole periphery thereof in such a manner as to lock said pin with said small end along said whole periphery of said median part.

12. A piston assembly comprising a piston, a connecting rod having a small end with an eye therein and a pin of soft steel extending through said eye and journalled in the bosses of said piston, said pin being in one piece and hollowed with a continuous external peripheral wall along its whole length and provided in its parts journalled in the bosses of said piston with hardened surfaces whereas the external non-hardened surface of its median part located in the eye of the small end has an extended diameter and is locked along the whole periphery thereof in said small end.

13. A piston assembly comprising a piston, a connecting rod having a small end with an eye therein and a pin of soft steel extending through said eye and journalled in the bosses of said piston, said pin being in one piece and hollowed with a continuous external peripheral wall along its whole length and provided in its parts journalled in the bosses of said piston with hardened surfaces whereas the external non-hardened surface of its median part located in the eye of the small end has an extended diameter, is elastically deformed and locked in said small end along the whole periphery of said median part.

14. A piston assembly comprising a piston, a connecting rod having a small end with an eye therein and a pin of soft steel extending through said eye and journalled in the bosses of said piston, said pin being in one piece and hollowed with a continuous external peripheral wall along its whole length and provided in its parts journalled in the bosses of said piston with hardened surfaces whereas the external non-hardened surface of its median part located in the eye of the small end has an extended diameter, is permanently deformed and locked in small end along the whole periphery of said median part.

15. A piston assembly comprising a piston, a connecting rod having a small end with an eye therein and a pin of soft steel extending through said eye and journalled in the bosses of said piston, said pin being in one piece and hollowed with a continuous external peripheral wall along its whole length and provided in its parts journalled in the bosses of said piston with hardened surfaces whereas the external non-hardened surface of its median part located in the eye of the small end has an extended diameter and is locked in said small end along the whole periphery of said median part, said hollowed pin being provided with a full median transverse partition integral therewith.

16. A piston assembly comprising a piston, a connecting rod having a small end with an eye therein and a pin of soft steel extending through said eye and journalled in the bosses of said piston, said pin being in one piece and hollowed with a continuous external peripheral wall along its whole length provided in its parts journalled in the bosses of said piston with hardened surfaces whereas the external non-hardened surface of its median part located in the eye of the small end has has an extended diameter and is locked along the whole periphery of said median part in said small end, said hollowed pin being provided with a full median transverse partition inserted and fixed into said hollowed pin along the whole periphery thereof.

17. A piston assembly comprising a piston, a connecting rod having a small end with an eye therein and a pin of soft steel extending through said eye and journalled in the bosses of said piston, said pin being in one piece and hollowed with a continuous external peripheral wall along its whole length and provided in its parts journalled in the bosses of said piston with hardened surfaces whereas the external non-hardened surface of its median part located in the eye of the small end has an extended diameter and is locked along the whole periphery of said median part in said small end, said hollowed pin being provided with a median transverse partition itself provided with an axial constriction of its section, and means for expanding said constriction.

18. A piston assembly comprising a piston, a connecting rod having a small end with an eye therein and a pin of soft steel extending through said eye and journalled in the bosses of said piston, said pin being in one piece and hollowed with a continuous external peripheral wall along its whole length and provided in its parts journalled in the bosses of said piston with hardened surfaces whereas the external non-hardened surface of its median part located in the eye of the small end has an extended diameter and is locked along the whole periphery of said median part in said small end, said hollowed pin being provided with a median transverse partition integral therewith and provided with an axial constriction, and means for expanding said constriction.

19. A piston assembly comprising a piston, a connecting rod having a small end with an eye therein and a pin of soft steel extending through said eye and journalled in the bosses of said piston, said pin being in one piece and hollowed with a continuous external peripheral wall along its whole length and provided in its parts journalled in the bosses of said piston with hardened surfaces whereas the external non-hardened surface of its median part located in the eye of the small end has an extended diameter and is locked along the whole periphery of said median part in said small end, said hollowed pin being provided with a median transverse partition made of a closed ring inserted into said hollowed pin, and means for expanding the central opening in said ring.

20. A piston assembly comprising a piston, a connecting rod having a small end with an eye therein and a pin of soft steel extending through said eye and journalled in the bosses of said piston, said pin being in one piece and hollowed with a continuous external peripheral wall along its whole length and provided in its parts journalled in the bosses of said piston with hardened surfaces whereas the external non-hardened surface of its median part located in the eye of the small end has an extended diameter and is locked along the whole periphery of said median part in said small end, said hollowed pin being provided with a median transverse partition itself provided with an axial threaded constriction of its section, and a tapered threaded bolt for expanding said constriction.

21. A piston machine comprising, at least, a piston assembly including a piston, a connecting rod having a small end with an eye therein and a pin of soft steel extending through said eye and journalled in the bosses of said piston, said pin being in one piece and hollowed with a continuous external peripheral wall along its whole length and provided in its parts journalled in the bosses of said piston with hardened surfaces whereas the external non-hardened surface of its median part located in the eye of the small end has an extended diameter and is locked along the whole periphery thereof in said small end.

22. A piston assembly as set forth in claim 17 wherein said last-mentioned means comprises an expanding plug of different diameters at different points along the axial length thereof.

23. A piston assembly as set forth in claim 17 wherein said last-mentioned means comprises a conically-shaped expanding plug.

24. A piston assembly as set forth in claim 17 wherein said last-mentioned means comprises a conically-shaped expanding plug and having the anterior conical part of greater conicity than that of the remaining part.

25. A piston assembly as set forth in claim 17 wherein said last-mentioned means comprises a conically-shaped expanding plug, the anterior part of which is of curved profile.

References Cited in the file of this patent

UNITED STATES PATENTS

| | | |
|---|---|---|
| 1,404,654 | Saxton | Jan. 24, 1922 |
| 1,410,493 | Meuvly | Mar. 21, 1922 |
| 1,480,185 | Setter | Jan. 8, 1924 |
| 1,684,862 | Gay | Sept. 18, 1928 |
| 1,722,389 | Opie et al. | July 30, 1929 |
| 1,909,553 | Schermer et al. | May 16, 1933 |
| 1,997,309 | Robins | Apr. 9, 1935 |
| 2,142,017 | Riemenschneider et al. | Dec. 27, 1938 |